3,046,291
POLYMERS OF SILACYCLOBUTANES
Leo H. Sommer, State College, Pa., assignor to Dow Corning Corporation, Midland, Mich., a corporation of Michigan
No Drawing. Filed May 5, 1958, Ser. No. 732,802
5 Claims. (Cl. 260—448.2)

The present invention relates to certain silacyclobutanes, methods for their preparation, and polymers derived therefrom.

The monomeric products of this invention are silacyclobutanes of the formula

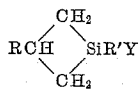

where Y is selected from the group consisting of Cl and H, R is selected from the group consisting of H and the radical —CH₃, and R' is a monovalent hydrocarbon radical free of aliphatic unsaturation.

Although the literature reports that one Hart prepared the compound

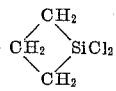

by the reaction of sodium 1,3-dibromopropane, and SiCl₄ [Rep. Brit. Assoc., 661 (1887)], later attempts to reproduct Hart's work were completely unsuccessful (Widdowson, J. Chem. Soc., 1926, 958). Five and six membered rings of this type have been prepared by reacting a di-Grignard reagent with SiCl₄ [Ber. 48, 1236 (1915)]. Attempts to prepare silacyclobutane derivatives in such a manner, however, have been found to be futile because of the unstable nature of the di-Grignard reagent of a 1,3-dihalopropane.

I have found that the silacyclobutanes of this invention can be prepared, however, by reacting

with magnesium. Apparently the resulting Grignard reagent then reacts with itself to form the desired chlorosilane product:

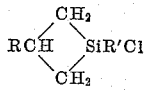

A similar reaction may be carried out when other halogens are present in the starting silane in place of the chlorine, but commercial expediency dictates the use of the silane illustrated above.

The desired product is obtained to some degree regardless of the ratio of silane to magnesium employed. For efficiency of operation and best yields, however, it is preferred to use about an equimolar ratio. It is also best to conduct the reaction in the presence of an inert solvent to aid in establishing contact between the reactants and as a suspension medium for the by-product MgCl₂. Conventional Grignard solvents such as the hydrocarbon ethers, including cyclic ethers such as tetrahydrofuran, and aromatic hydrocarbons such as benzene, toluene, and xylene, are all applicable. Any solvent used should, of course, be used in as nearly an anhydrous state as is feasible.

Other conventional and well known techniques applied in working with Grignard reagents can be employed if desired. For example, if the reaction is slow in starting, a trace of iodine or of a very active alkyl halide such as methyl bromide can be added, or the solvent-magnesium mixture can be heated with only a small amount of the starting silane present. Once the reaction is initiated, it can be maintained by the addition of the remainder of the starting silane to the reaction mass. Ordinarily the reaction is exothermic, so cooling can be applied if a fast rate of addition is desired. The reaction temperature is not critical, but of course it is best to maintain the starting silane, and any solvent present, in the liquid phase. The reaction can be carried out under pressure if it is desired to operate at a temperature above the boiling point of the solvent, but ordinarily there is no need for elevated temperatures and the process will be carried out at from room temperature to the reflux temperature of the lowest boiling liquid present. Thus a reaction temperature ranging from about 25° to 100° C. is preferred. As is usual with such reactions, the magnesium is best employed in finely divided form, e.g., as chips or granules.

When the product in which Y is a hydrogen atom is desired, the Cl substituted silacyclobutane described above is reacted with lithium hydride or lithium aluminum hydride.

The starting silane ClCH₂CHRCH₂SiR'Cl₂ used in the reaction described above can be prepared, e.g., by reacting a silane of the formula R'HSiCl₂ with either allyl chloride or methallyl chloride in the presence of an appropriate catalyst. The preferred catalysts are chloroplatinic acid, usually used as the hexahydrate and in a ratio of about 1×10⁻⁵ mole per mole silane, or platinum deposited on powdered charcoal. Suitable reaction temperatures vary from room temperature to 150° C., depending upon the particular silane used and the type and amount of catalyst present. The R'HSiCl₂ compounds are well known, and those which are not commercially available can be produced by Grignardizing HSiCl₃ to introduce any desired R' group.

As noted previously, R' can be any monovalent hydrocarbon radical free of aliphatic unsaturation. Thus, for example, R' can be alkyl such as methyl, ethyl, propyl, or octadecyl; aryl such as phenyl, xenyl, or naphthyl; alkaryl such as tolyl or xylyl; aralkyl such as benzyl; and cycloaliphatic such as cyclohexyl.

The polymers prepared from the

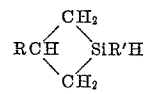

compounds vary from low viscosity liquids, through high viscosity liquids, to nonflowing gels. Polymers in any of these physical states can also be made to vary in their molecular structure in regard to the presence or absence of siloxane linkages.

For example, when the monomer is heated in glass and oxygen and moisture are excluded, analysis shows that the resulting polymer consists essentially of units having the formula [—CH₂CHRCH₂(R')(H)Si—]. The speed of this polymerization is dependent upon the temperature employed. At 50°–70° C. about 40% of the monomer is converted to polymer in two hours. Higher temperatures, e.g., 150°–200° C., speed up the polymerization. Elevated temperatures are not necessary, however, for it has been found that even at room temperautre sufficient polymerization takes place to use up about 65% of the monomer in a period of six months. The addition of a mere trace of an acidic compound will retard or prevent this type of polymerization, and it appears that the slight trace of alkali extracted by the sample from a glass container enhances the polymerization.

A different molecular structure is brought about when the polymerization takes place in the presence of oxygen and/or water. Under such circumstances, infrared analysis shows that the polymer is like that which was described above except for the fact that it contains siloxane linkages, which are absent in the first described polymer. The configuration of the latter type of structure is not known. Very small amounts of oxygen or water bring about this unusual result, and either or both can be introduced by merely exposing the reaction mass to the atmosphere during the polymerization. Naturally the speed and degree of siloxane linkage formation can be enhanced by introducing oxygen and/or water as such in larger amounts than that furnished by air alone. In such a case, any amount is operative and no particular upper limit exists.

The polymerizations described above can be expedited by carrying them out in the presence of added alkaline catalysts, i.e., alkaline material added above and beyond that which is supplied by any glass containers or apparatus which might be used. The rate and degree of polymerization will again be variable, dependent upon the polymerization temperature as well as the type and amount of catalyst present, so no meaningful limits can be set as to these factors. With an added catalyst present, polymerization occurs at room temperature but is ordinarily speeded up by heating the material at, e.g., 50°–200° C. Even higher temperatures can be employed if desired, but of course the duration of exposure should be limited to avoid excessive decomposition of the polymer.

As noted above, even the minute trace of alkalinity furnished by glass containers is sufficient to catalyze the polymerization. Hence there is no describable minimum amount of alkaline catalyst which can be used. Nor is there any apparent maximum beyond which polymerization would not take place, but large excesses would only pose a problem in removing the catalyst after polymerization is complete.

It is known that strongly alkaline materials such as NaOH, KOH, and LiOH can cause a quantitative liberation of hydrogen from compounds containing silicon bonded hydrogen. Thus in the present case the use of sufficient amounts of such catalysts produces a cross-linked gel which is relatively free of silicon bonded hydrogen, the latter having been replaced by siloxane linkages and/or silicon bonded hydroxy groups. Such an effect may be desired when the organosilicon compound is to be "set" or fully cured in place. With the alkali metal hydroxides such an effect can be produced by using, e.g., 0.1 to 1% of the catalyst by weight based on the weight of the organosilicon compound. For maximum effect, such catalysts can be used in powdered form or in the form of their aqueous or alcoholic solutions. For less drastic rates and degrees of polymerization, correspondingly less catalyst can be used.

It is to be understood that the alkaline catalyzed polymerization can be applied to either the monomeric silacyclobutane itself, or to any intermediate molecular weight polymer thereof in order to achieve further polymerization. The same is true of polymerization in the presence of oxygen and/or water. In other words, when it is desired to market or use a polymer of intermediate viscosity, the monomer is subjected to only an intermediate extent of polymerization. Any catalyst present can then be removed until the time that further polymerization is wanted, at which time a catalyst can again be added to the system and/or the material heated, etc. This technique may be used when for operational reasons one wishes to work with a moderately viscous material which must assume either a more viscous or a non-flowing nature after it has been placed in its ultimate position.

Other catalysts which can be used to further polymerize or "cure" the organosilicon compounds of this invention include quaternary ammonium compounds such as trimethylbenzylammonium butoxide, trimethyl-2-hydroxyethylammonium bicarbonate, and trimethyl-2-hydroxyethylammonium 2-ethylhexoate. Metallic salts such as sodium bicarbonate, sodium aluminate, and the iron, cobalt, manganese, lead and zinc salts of carboxylic acids (e.g., the acetates, octoates, and naphthenates of such metals) also can be used advantageously as curing agents, particularly where siloxane linkages and/or silicon bonded hydroxy groups are present in the intermediate polymer.

The monomeric chlorosilane of this invention can be hydrolyzed by contacting it with water, to produce the disiloxane

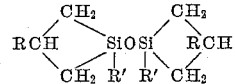

This disiloxane can undergo polymerization reactions both by rupture of the silacyclobutyl ring and by conventional siloxane rupture and rearrangement reactions.

Any of the polymers of this invention which contain siloxane linkages can be copolymerized with conventional organosiloxanes by making use of the well known organosiloxane rearrangement techniques. Thus, for example, a siloxane-containing polymer which has been derived from the described silacyclobutanes can be mixed with an organosiloxane of the average general formula

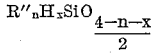

where $n$ has an average value of from 1 to 3 inclusive, $x$ is 0 or 1, and $n+x$ is not greater than 3, and R″ is any monovalent hydrocarbon radical (including substituted radicals containing functional groups such as those described by George, Prober, and Elliot in "Chemical Reviews" 56, 1065), and the mixture copolymerized in the presence of catalysts such as concentrated sulfuric acid, trifluoroacetic acid, NaOH, KOH, or LiOH.

The major utility of the monomers of this invention lies in their use as polymer sources, although they can be used directly as water repellents by applying them to e.g., textiles, masonry, or leather and curing them after such application. The polymers of this invention can be used as damping media, potting compounds, electrical insulation, water repellents, and other similar uses for which the conventional organosilicon fluids and gums have become well known.

The following examples are illustrative only. The symbols Me, Et, and Ph have been used to represent methyl, ethyl, and phenyl radicals, respectively.

*Example 1*

MeHSiCl$_2$ and allyl chloride were mixed in the molar ratio of 3:2 in the presence of about 1% by weight of a catalyst consisting of 2% by weight platinum deposited on charcoal. After the exothermic reaction subsided, the reaction mass was heated at reflux overnight, filtered, and distilled to provide the silane ClCH$_2$CH$_2$CH$_2$SiMeCl$_2$, B.P. 80° C./18 mm. Hg. A solution of 191.5 g. (1 mole) of this silane in 500 ml. diethyl ether was then added slowly to a stirred suspension of 26 g. (1 mole) magnesium in 1400 ml. of the ether. When the exothermic reaction subsided at the end of the addition, the mass was heated at reflux for 48 hours. After separating the solids by centrifugation, the liquid product was distilled to yield the compound

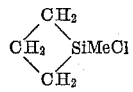

B.P. 103.8° C./731 mm. Hg.

*Example 2*

A solution of 24.1 g. (0.2 mole) of the product from Example 1 in 100 ml. of diethyl ether was slowly added to a slurry of 3.8 g. (0.1 mole) LiAlH$_4$ in 100 ml. ether. The mixture was refluxed overnight, and 40 g. Me$_3$SiCl added to decompose the excess LiAlH$_4$. This mixture was hydrolyzed by adding it to 200 ml. of a 4 M phosphate buffer solution having a pH of 6.8. The ether layer was separated and dried over anhydrous magnesium sulfate, and then distilled to yield the product

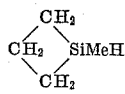

B.P. 63° C./729 mm. Hg.

*Example 3*

When the procedure of Example 1 is repeated, but using either PhHSiCl₂ or EtHSiCl₂ in place of the starting MeHSiCl₂, the products

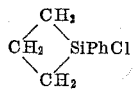

and

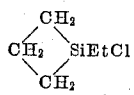

are obtained, respectively.

*Example 4*

Methallyl chloride was used in the procedure of Example 1, in place of the allyl chloride, to produce the silane ClCH₂CHMeCH₂SiMeCl₂, B.P. 95° C./27 mm. Hg. The latter silane was reacted with magnesium, using ether as a solvent and employing the same technique as in Example 1. Upon distilling the liquid portion of the reaction mass there was obtained the compound

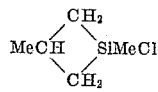

boiling at 116° C./718 mm. Hg. When the latter is reacted with LiAlH₄ as in Example 2, the silicon bonded Cl is replaced by a silicon bonded H atom.

*Example 5*

A sample of the 1-methyl-1-silacyclobutane prepared as in Example 2 was heated at 62°–63° C. for two hours under a nitrogen atmosphere while being distilled through a column packed with glass helices. Upon removing all of the unpolymerized material it was found that about 40% of the starting monomer had been converted to a clear polymer having a viscosity of about 1000 cs. at 25° C. Infrared analysis showed that the polymer no longer contained silacyclobutyl groups, but did contain silicon bonded hydrogen. This polymer consisted essentially of units of the formula

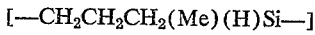

When a small amount of alcoholic KOH was mixed with this polymer, there was a vigorous evolution of hydrogen and a gelled siloxane was produced.

*Example 6*

A sample of freshly distilled 1-methyl-1-silacyclobutane was sealed in a glass ampoule and allowed to stand for six months at room temperature. The sample became quite viscous in this time, and when the unreacted monomer was removed under reduced pressure, it was found that 65% of the original material had become a clear viscous fluid of about 5000 cs. viscosity. This polymer had the same infrared spectral properties and underwent the same reactions as that produced in Example 5.

*Example 7*

When a sample of the 1-methyl-1 silacyclobutane was heated in glass without being protected from the atmosphere, a polymer similar to that of Example 5 was produced, with the exception that now infrared analysis clearly showed that the polymer also contained siloxane linkages.

I claim:
1. A polymeric organosilicon compound consisting essentially of units having the general formula

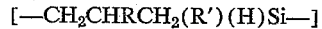

where R is selected from the group consisting of H and the radical —CH₃, and R' is a monovalent hydrocarbon radical free of aliphatic unsaturation.

2. A polymeric organosilicon compound consisting essentially of units having the formula

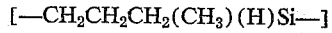

3. A polymeric organosilicon compound containing siloxane linkages and consisting essentially of the reaction product obtained by the process comprising polymerizing an organosilicon compound (I) containing silicon-bonded hydrogen and selected from the group consisting of (A) monomers of the formula

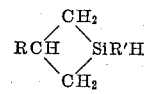

where R is selected from the group consisting of H and the radical —CH₃ and R' is a monovalent hydrocarbon radical free of aliphatic unsaturation, and (B) polymers consisting essentially of units having the general formula [—CH₂CHRCH₂(R')(H)Si—] where R and R' are as above defined, in the presence of a siloxane linkage-former (II) selected from the group consisting of water and oxygen, and in the presence of (III) an alkaline catalyst, by contacting (I), (II), and (III) in a liquid phase for a time sufficient to cleave at least some of the silicon-bonded hydrogen atoms in (I).

4. A reaction product in accordance with claim 3 wherein R is H and R' is a methyl radical.

5. A process comprising polymerizing an organosilicon compound (I) containing silicon-bonded hydrogen and selected from the group consisting of (A) monomers of the formula

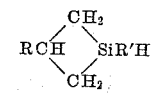

where R is selected from the group consisting of H and the radical —CH₃ and R' is a monovalent hydrocarbon radical free of aliphatic unsaturation, and (B) polymers consisting essentially of units having the general formula [—CH₂CHRCH₂(R')(H)Si—] where R and R' are as above defined, in the presence of a siloxane linkage-former (II) selected from the group consisting of water and oxygen, and in the presence of (III) an alkaline catalyst, by contacting (I), (II), and (III) in a liquid phase for a time sufficient to cleave at least some of the silicon-bonded hydrogen atoms in (I).

References Cited in the file of this patent

UNITED STATES PATENTS

| | | |
|---|---|---|
| 2,383,817 | Rochow | Aug. 28, 1945 |
| 2,486,162 | Hyde | Oct. 25, 1949 |

FOREIGN PATENTS

| | | |
|---|---|---|
| 622,970 | Great Britain | May 10, 1949 |

OTHER REFERENCES

Sommer et al.: Jour. Am. Chem. Soc., vol. 79 (June 1957), pages 3295–6.

Campbell: Doctoral Thesis, Pennsylvania State University, June 1957.

Petrov et al.: "Izvest. Akad. Nauk., S.S.S.R., Otdel Khim. Nauk.," 1957, pp. 1206–17 (Chem. Abstr., vol. 52, p. 6160).

Sommer et al.: "Jour. Am. Chem. Soc.," vol. 76 (1954), p. 5002.

West: ibid., pp. 6012–17.